R. M. WOOD & W. R. SARGENT.
FRICTION CLUTCH.
APPLICATION FILED OCT. 9, 1912.

1,065,489.

Patented June 24, 1913.

Witnesses
Chas. L. Griesbauer
A. I. Hud.

Inventors
R. M. Wood and
W. R. Sargent,
By Watson E. Coleman,
Attorney

UNITED STATES PATENT OFFICE.

ROBERT M. WOOD AND WALTER R. SARGENT, OF RANDOLPH, VERMONT.

FRICTION-CLUTCH.

1,065,489. Specification of Letters Patent. Patented June 24, 1913.

Application filed October 9, 1912. Serial No. 724,897.

*To all whom it may concern:*

Be it known that we, ROBERT M. WOOD and WALTER R. SARGENT, citizens of the United States, residing at Randolph, in the county of Orange and State of Vermont, have invented certain new and useful Improvements in Friction-Clutches, of which the following is a specification, reference being had to the accompanying drawings.

This invention relates to new and useful improvements to a friction governor pulley more particularly adapted for use with cream separators, but may be advantageously used in connection with machines which are adapted to drive at predetermined rates of speed, the main object of the invention being to absorb all shock of the engine and to operate the separator steadily at a given speed.

A further object of the invention is to provide a friction governor pulley in which portions thereof are capable of adjustment to vary the predetermined rate of speed desired.

A further object of the invention is to provide a friction governor pulley which will possess advantages in points of efficiency and durability, is inexpensive to manufacture and at the same time is simple in construction and operation.

Figure 1:
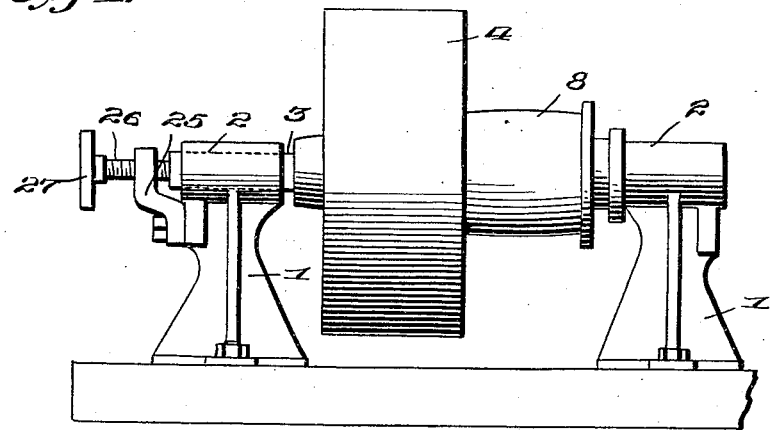
Figure 2:
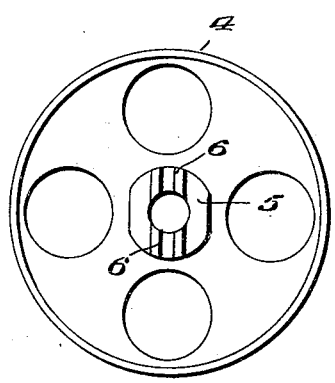
Figure 3:
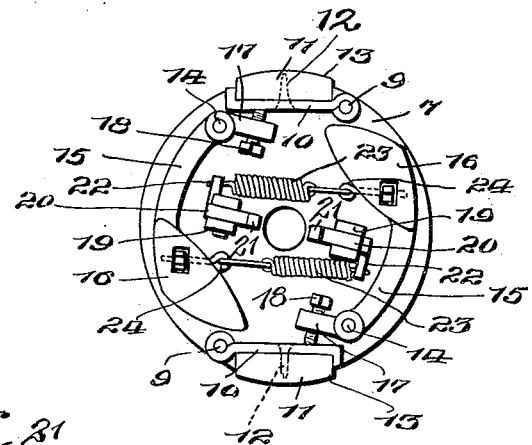
Figure 4:
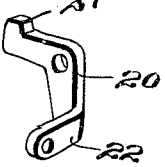

With the above and other objects in view, the invention consists in the novel features of construction and the combination and arrangement of parts hereinafter more fully described, pointed out in the claims and shown in the accompanying drawings in which, Figure 1 is a side elevation. Fig. 2 is an elevation of the pulley. Fig. 3 is a side elevation of the clutch of the engine, and Fig. 4 is a detail perspective view of one of the bell cranks.

Referring more particularly to the drawings 1 indicates suitable standards which are provided at their upper ends with the journals 2 in which are mounted the ends of the longitudinal shaft 3. Mounted upon the shaft 3 is a pulley 4 which is suitably connected by means of a belt to the engine. Mounted upon the shaft and arranged within the pulley is a collar 5 which is provided upon one side thereof with the spaced lugs 6 which are arranged at diametrically opposite points.

Mounted upon the shaft and arranged within the pulley at one side thereof is a circular plate 7 having a suitable pulley 8 formed integral with the outer face thereof and mounted upon the shaft 3. The pulley 8 is connected by means of a belt (not shown) to the separator or other machine which is to be operated. Pivotally mounted upon the pins 9 which are arranged at diametrically opposite points upon the outer edge of the plate 7 are the shoe holders 10 in which are arranged the wooden shoes 11, said shoes being held securely in place by means of the screws 12 passing through the holder and into the shoe. The outer faces of the shoes 11 are beveled off as shown at 13 co-incident with the inner face of the pulley 4. Pivotally mounted upon the pins 14 which are secured to the plate 7 adjacent the free ends of the holders 10 are the arms 15 of the weights 16, said arms and weights being of suitable shape to conform to the circular plate 7. The arms 15 are provided with substantially right angled extensions 17 in which are mounted the set screws 18, the inner ends of which engage the holders 10 to retain the shoes 11 in engagement with the inner face of the pulley 4.

Arranged upon opposite sides of the center of the plate 7 are the bifurcated lugs 19 between the outer ends of which are pivotally mounted the bell cranks 20, the inner ends of which are provided with the upturned ends 21 adapted to be fitted in between the spaced lugs 6 upon the collar 5 so that any movement of the collar 5 upon the shaft 3 will actuate the bell cranks 20. The other ends of the bell cranks 20 are provided with the outwardly extending lugs 22 to the outer ends of which are secured one end of the coil springs 23, the other end of said springs being connected by means of the lugs 24 to the weights 16. Thus it will be seen that when the collar 5 is moved upon the shaft toward the plate 7, the pressure upon the inner ends of the bell cranks 20 will tend to force the shoes 11 into engagement with the inner face of the pulley 4 so that the pulley will rotate with the plate 7.

Mounted upon one of the standards at the outer side thereof is a suitable bracket 25 in which is mounted a screw 26, the inner end of which engages one end of the shaft 3. Mounted upon the outer end of the screw 26 is a hand wheel 27 by means of which the screw is turned to reciprocate the shaft 3, Thus it will be apparent that by the adjustment of the screw 26 the speed of the pulley 4 may be readily determined.

It will be apparent that the faster the wheel 8 revolves, the axle 3 will have to be moved axially to retain the shoes 11 into engagement with the inner face of the wheel. This is due to the fact that the faster the wheel revolves, the farther out from the center the weights 16 will swing, thus relieving the pressure upon the shoes 11. As the shaft 3 is moved axially, the upturned ends 21 are pressed inwardly tending to pull the weights toward the center of the plate through the tension of the spring 23. Thus it will be apparent that when the wheel 8 obtains a high rate of speed, the weights will move toward the edge of the plate 7 relieving the shoes 11 from pressure against the inner face of the wheel and reducing the speed of the same. But if it is desired to sustain this high rate of speed, the axle 3 will be moved inwardly far enough to overcome the tension of the springs 23 due to the centrifugal force of the weights and retain the shoes in engagement with the inner face of the pulley.

In the operation of our improved friction governor pulley, the plate 7 and the pulley 8 are loosely mounted upon the shaft 3, the pulley 8 being suitably connected to any well known form of power, the collar 5 is also loosely mounted upon the shaft 3 and arranged within the pulley 4 which in turn is keyed to the shaft 3, the plate 7 being arranged within the pulley at one side thereof. Thus it will be apparent that by the turning movement of the screw 26, the shaft 3 will be moved longitudinally carrying the pulley 4 toward the plate 7, thus forcing the collar 5 which is engaged with the upturned ends 21 of the bell cranks 20 toward the plate, manipulating the bell cranks and pulling inwardly upon the weights 16 which in turn will force the said screws 18 against the holders 10 and engage the shoes 11 with the inner surface of the pulley. The speed of the pulley 4 will be regulated by the turning movement of the screw 26 which will engage and disengage the shoes 11 with the inner surface of the pulley, the inward movement of the screw increasing the speed while the outer movement thereof will decrease the rate of speed.

From the above description taken in connection with the accompanying drawings, it will be readily apparent that we have provided a simple friction cover pulley which is adapted for use with cream separators and which will absorb the shock of the engine and operate the separator at a given speed.

While we have shown and described the preferred form or our invention, it will be obvious that various changes in the details of construction and in the proportions may be resorted to for successfully carrying our invention into practice without sacrificing any of the novel features or departing from the scope of the appended claims.

What we claim is:—

1. In a device of the character described, the combination of a shaft, a driven pulley mounted upon said shaft, a circular plate formed integral with said pulley, shoe holders pivotally mounted upon said plate and arranged at diametrically opposite points, shoes arranged within said holders, curved arms pivotally mounted upon said plate, weights formed integral with said arms at one end thereof, the other end of each arm being bent substantially at right angles and a set screw carried thereby to engage the shoe holder, bell cranks carried by the plate, coil springs connecting one of the ends of the bell cranks to said weights, a band wheel fixed to said shaft, means for moving the shaft axially and means carried by the shaft and adapted to engage the other ends of the bell cranks to actuate the shoes and cause the same to grip said wheel for rotation with the driven pulley.

2. In a device of the character described, the combination of a shaft, a driven pulley mounted upon said shaft, a circular plate formed integral with said pulley, shoe holders pivotally mounted upon said plate and arranged at diametrically opposite points, shoes arranged within said holders, curved arms pivotally mounted upon said plate, weights formed integral with each of said arms at one end thereof, the other end of each of said arms being bent substantially at right angles and a set screw carried thereby to engage the shoe holder, said plate being provided with bifurcated lugs, bell cranks pivotally mounted upon said lugs, outwardly extending lugs formed integral with one of the ends of said bell cranks, coil springs having one of their ends connected to the lugs upon the bell cranks and their other ends adjustably connected to the weights, the inner ends of said bell cranks being turned upwardly at right angles to the body portion thereof, a collar slidably mounted upon the shaft, spaced lugs arranged at diametrically opposite points upon the collar and adapted to engage the upturned ends of the bell cranks, a band wheel fixed to said shaft and engaging said collar, and means for moving the shaft axially to engage the collar with the inner ends of the bell cranks to actuate the shoes and cause the same to grip said wheel for rotation with the driven pulley.

3. In a device of the character decribed, the combination of standards having bearings at their upper ends, a shaft mounted in said bearings, a driven pulley mounted upon said shaft, a circular plate formed integral with said pulley, pivotally mounted clutch members carried by said plate, curved arms pivotally mounted upon said plate, weights formed integral with one of the ends of said arms, set screws carried by the other ends of said arms and adapted to engage said clutch members, bell cranks pivotally mounted upon said plate, coil springs connecting said bell cranks with the weights, a band wheel fixed to said shaft, a bracket secured to one of said standards, a screw carried by the bracket and adapted to engage one end of the shaft, a hand wheel upon the outer end of the screw whereby the turning movement of the screw will move the shaft axially, and means carried by said band wheel for engaging one end of the bell cranks to actuate the clutch members and cause the same to grip said wheel for rotation with the shaft.

In testimony whereof we hereunto affix our signatures in the presence of two witnesses.

ROBERT M. WOOD.
WALTER R. SARGENT.

Witnesses:
JOHN C. SHERBURNE,
D. H. FLINT.

Copies of this patent may be obtained for five cents each, by addressing the "Commissioner of Patents, Washington, D. C."